United States Patent [19]

Shimizu

[11] 4,147,416
[45] Apr. 3, 1979

[54] ELECTROCHROMIC DISPLAY DEVICE

[75] Inventor: Shotaro Shimizu, Kunitachi, Japan

[73] Assignee: Citizen Watch Co., Ltd., Tokyo, Japan

[21] Appl. No.: 782,987

[22] Filed: Mar. 30, 1977

[30] Foreign Application Priority Data

Mar. 30, 1976 [JP] Japan ............................ 51/34954
Mar. 30, 1976 [JP] Japan ............................ 51/34955
Apr. 2, 1976 [JP] Japan ............................ 51/36880

[51] Int. Cl.² ........................................ G02F 1/00
[52] U.S. Cl. ............................................ 350/357
[58] Field of Search ........................ 350/160 R, 357

[56] References Cited

U.S. PATENT DOCUMENTS 4,006,969  2/1977  Kouchi et al. ............... 350/160 R Primary Examiner—Stanley D. Miller, Jr.
Assistant Examiner—James W. Davie
Attorney, Agent, or Firm—Koda and Androlia

[57] ABSTRACT

An electrochromic display device which includes a transparent front substrate, at least one transparent display electrode formed on the front substrate, a counter substrate parallel to the front substrate, at least one display electrode provided on the counter substrate adjacent the display electrode on the front substrate, a spacer which maintains the front and counter substrate parallel to each other, a transparent electrolyte which is enclosed between the front and counter substrates and which is in contact with the front and counter substrates and which contains electrochromic material, a counter electrode which is in contact with the electrolyte and a means for selectively applying voltage between the counter electrode and the display electrodes.

13 Claims, 31 Drawing Figures

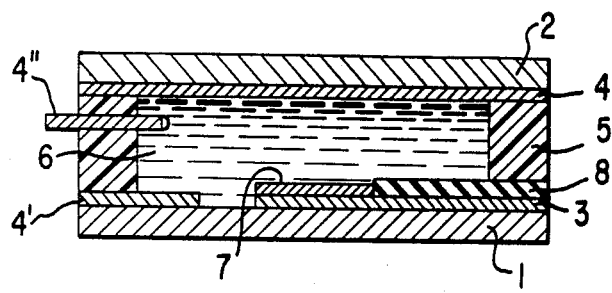
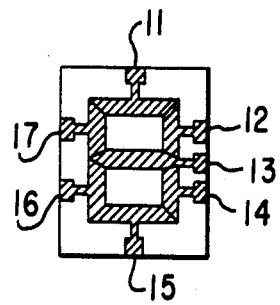
Fig. 1 (PRIOR ART)  Fig. 2
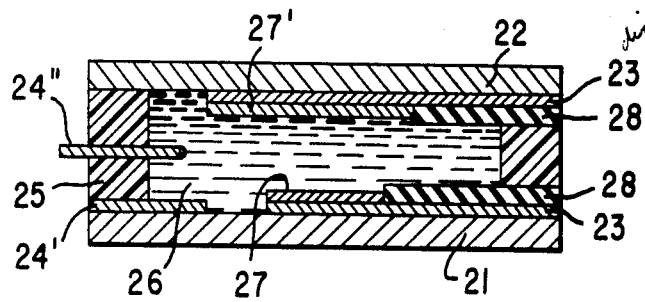
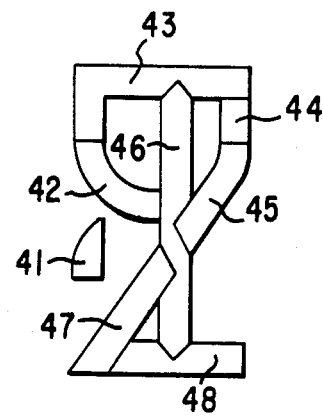
Fig. 3  Fig. 4a
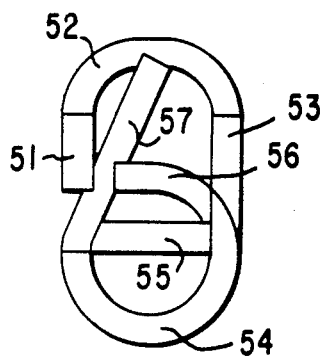
1 2 3 4 5
6 7 8 9 0
Fig. 4b  Fig. 5

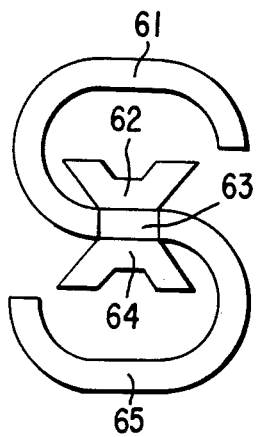
Fig. 6a
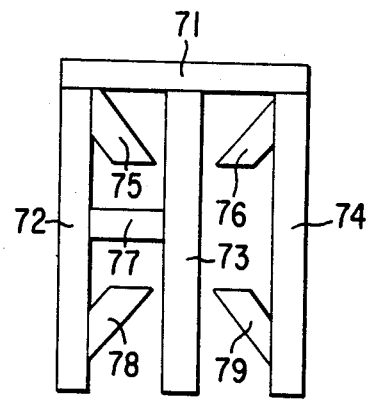
Fig. 6b
MTWFS
Fig. 6c
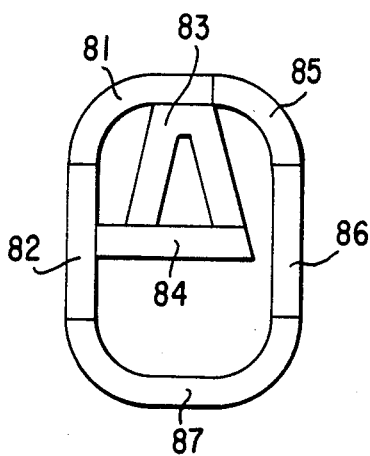
Fig. 7a
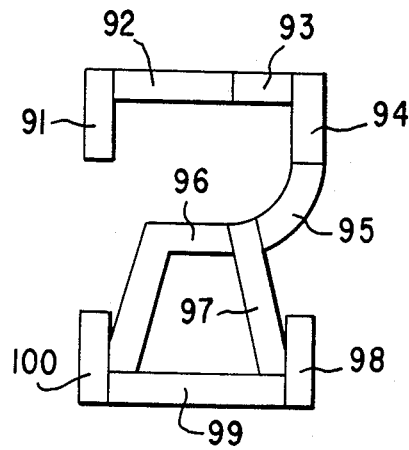
Fig. 7b
OUEHRA
Fig. 7c

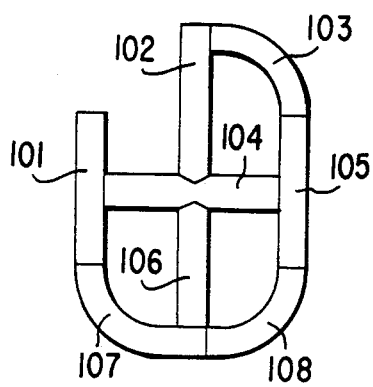
Fig. 8a
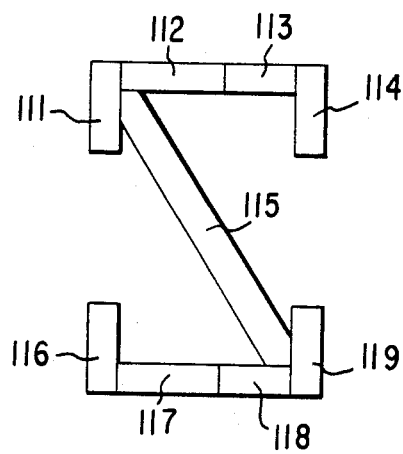
Fig. 8b
NEDUIT
Fig. 8c
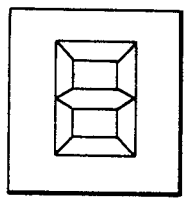
Fig. 9a
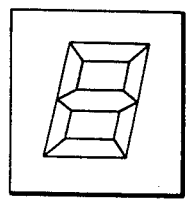
Fig. 9b
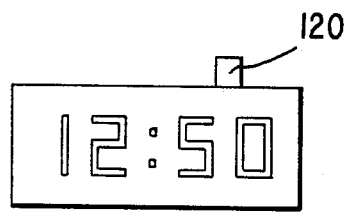
Fig. 10a
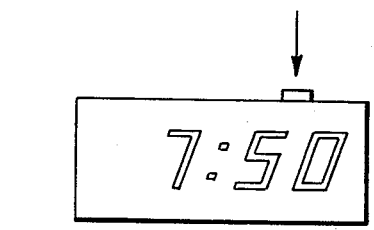
Fig. 10b

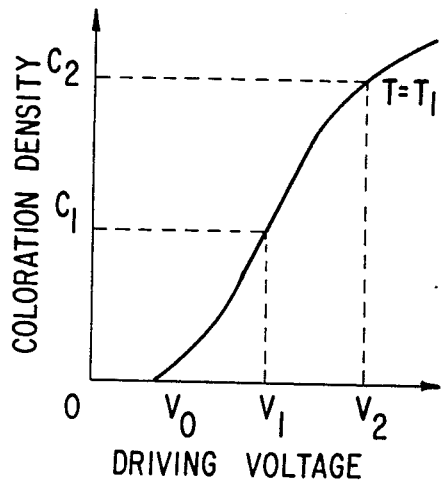
Fig. 11
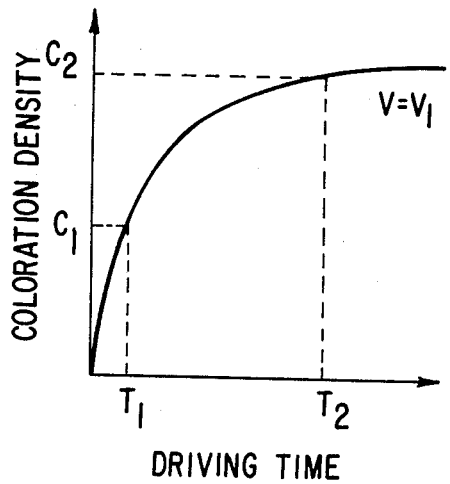
Fig. 12
Fig. 13

ELECTROCHROMIC DISPLAY DEVICE

BACKGROUND OF THE INVENTION

1. Field of Invention

This invention relates to electrochromic display devices and more particularly relates to electrochromic display devices which are able to display a large amount of information within a limited display area.

2. Prior Art

Image display devices which utilize electrochromic materials (materials which undergo reversable coloration as a result of electrochemical oxidation-reduction reactions) are well known. For example, a display device using inorganic oxide such as tungsten oxide, molybdenum oxide, etc., as the electrochromic material, has been disclosed in U.S. Pat. No. 3,827,784. A display device using organic dies such as viologen, has been disclosed in U.S. Pat. No. 3,806,229.

A greater amount of electrical energy is required in order to drive these electrochromic display devices than is needed to drive liquid crystal display devices. However, since electrochromic display devices have a memory effect, an image once displayed will persist without further energy consumption. Accordingly, the mean energy consumed is approximately equivalent to that consumed in driving liquid crystal display devices. Furthermore, since the display contrast in electrochromic display devices does not depend upon the glancing angle, legibility is very good. Accordingly, electrochromic display devices are appropriate for use in display devices and electronic timepieces, desk top calculators, hand held calculators, etc.

Electronic timepieces using electrochromic display devices have been disclosed in U.S. Pat. Nos. 3,839,859 and 3,950,936. In these electronic timepieces, display electrodes consisting of a large number of segments are selectively driven and numerals are displayed by combining colored segments.

In these electrochromic display devices, however, display electrodes are installed on only one-half of a pair of substrates that constitute the display cell. A counter electrode is installed on the remaining substrate. Accordingly, the number of segments that can be installed is of a limited number and it is not possible to overlap or cross segments. Therefore, the types or variations in the patterns that can be displayed is limited. Furthermore, the character forms of numerals, letters, etc., are unnatural patterns with poor legibility.

SUMMARY OF THE INVENTION

Accordingly, it is a general object of the present invention to provide an electrochromic display device on which a large amount of information may be displayed within a limited display area.

It is another object of the present invention to provide an electrochromic display device which can display numerals and letters of the alphabet with natural character forms.

It is yet another object of the present invenion to provide an electrochromic display device which can display both dark and light shades of coloration using a single level voltage source.

It is still another object of the present invention to provide an electrochromic display device which exhibits a quick response with a comparatively low driving voltage.

In accordance with the principles of the present invention, the objects are accomplished by a unique electrochromic display device which includes a transparent front substrate, at least one transparent display electrode provided on the front substrate, a counter substrate provided parallel and adjacent the front substrate, at least one display electrode provided on the counter substrate adjacent the display electrode on the front substrate, a transparent electrolyte enclosed within the substrate, an electrochromic material provided in the electrolyte a counter electrode which is coupled to the electrolyte and a means for selectively applying voltage between the counter electrode and the display electrodes.

Since a large number of display electrodes constituting a display may be installed without undue difficulty by distributing them on both the front and counter substrates, an alphanumeric display utilizing natural legible character forms is made possible. Furthermore, it is also possible to provide numeric display elements of different character forms on the front and counter substrates and to selectively use only one of the character forms. In addition, a light and shade display using a single voltage source is made possible by using the overlapping portions of the display electrodes on both substrates.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which:

FIG. 1 is a cross-sectional view of a prior art electrochromic display device;

FIG. 2 is a display electrode pattern which consists of seven segements which is utilized to display numerals;

FIG. 3 is a cross-sectional view of an electrochromic display device in accordance with the teachings of the present invention;

FIGS. 4a and 4b are the patterns of the display electrodes which are used to display numerals with natural character forms in the electrochromic display device in accordance with the teachings of the present invention;

FIG. 5 illustrates the natural character forms displayed by the display electrodes of FIGS. 4a and 4b;

FIGS. 6a, 6b, 6c, 7a, 7b, 7c, 8a, 8b, and 8c are patterns of display electrodes utilized to display the abbreviation of the days of the week in an electrochromic display device in accordance with the teachings of the present invention;

FIGS. 9a and 9b illustrate the patterns of the display electrodes used for a changeover display from Gothic to Italian character forms in an electrochromic display device in accordance with the teachings of the present invention;

FIGS. 10a and 10b illustrate examples of an electrochromic display device utilizing the patterns of FIGS. 9a and 9b;

FIG. 11 is a graph illustrating a relationship between driving voltage and coloration density in a prior art electrochromic display device;

FIG. 12 is a graph illustrating the relationship between the driving time and the coloration density in a prior art electrochromic display device;

FIG. 13 is a comparison between a conventional electrochromic display device and an electrochromic display device in accordance with the teachings of the present invention as applied to a semi-analog seconds display in an electronic timepiece;

DETAILED DESCRIPTION OF THE INVENTION

Figure 14:
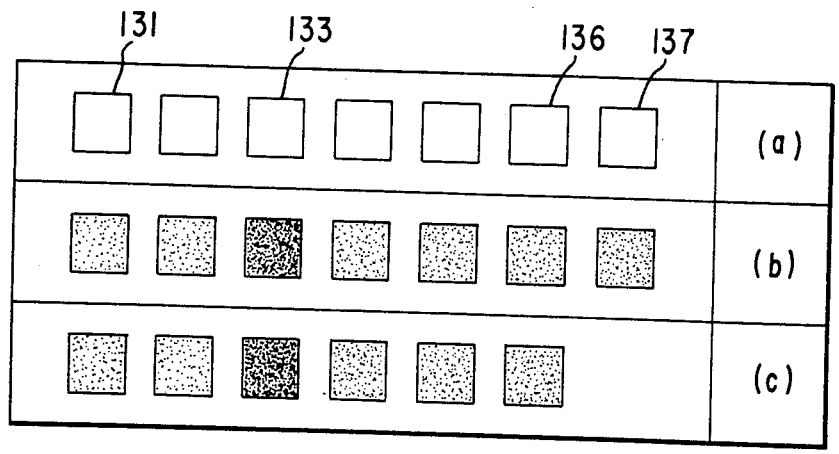
FIG. 14 is an example of an electrochromic display device in accordance with the teachings of the present invention which has been applied to a combination display of seconds and days of the week.

Referring more particularly to the drawings, shown in FIG. 1 is a cross-sectional view of a prior art electrochromic display device. The prior art electrochromic display device includes a front substrate 1 which is provided with display electrode 3 and a counter substrate 2 which is provided with a counter electrode 4. The front and counter substrates are arranged in parallel by means of a spacer 5. Electrolyte 6 is enclosed between the front and counter substrates 1 and 2.

The pattern portion of the display electrode 3 is covered by an electrochromic layer 7 and the remaining part is covered by an insulating layer 8. When a coating of tungsten oxide is used for the electrochromic layer 7, a solution of sulphuric acid with glycerine added is used for the electrolyte 6. Furthermore, when a viologen compound is used as the electrochromic material, a solution of potassium bromide is used for the electrolyte 6 and the electrochromic material is dissolved in the electrolyte 6 as viologen bromide.

When a voltage is applied to the display electrode 3 so that it becomes a cathode, the viologen bromide is reduced so that a color product is formed and deposited as an electrochromic layer 7 on the pattern part of the display electrode 3. In addition to viologen compounds, tungstate and molybdate solutions are well known as solution type electrochromic materials of this kind.

The counter electrode 4 does not necessarily have to be installed on the interior surface of the counter substrate 2. It can also be installed on the perimeter of the front substrate 1 as indicated by 4' in FIG. 1. Furthermore, it is also possible to employ a device in which a metallic wire 4" is placed within the electrolyte 6 and used as a lead terminal by passing one end of the wire through the spacer 5.

When this type of display cell is used to display the numerals 0 through 9, display electrodes consisting of seven segments 11 through 17 arranged in a figure 8 pattern as shown in FIG. 2 are employed. In this type of prior art display utilizing this type of display electrodes, the number of segments is small and their shape is linear. Accordingly, this type of display electrode suffers from the drawback that the character forms of the numeral display are unnatural and of poor eligibility. In order to eliminate this drawback, it is necessary to add several curved segments. However, there is no open space available on the front substrate for this purpose. Accordingly, in this invention separate segment type display electrodes are provided on both the front and counter substrates and are selectively driven to compose complex patterns.

Referring to FIG. 3, shown therein is a cross-sectional view of an electrochromic display device in accordance with the teachings of the present invention. In FIG. 3, those elements which are the same as those of FIG. 1 are given like reference numerals and a description of their interconnection and operation is omitted. In the electrochromic display device of FIG. 3, the electrochromic display device includes separate display electrodes 23 and 23' provided on the front substrate 21 and counter substrate 22. The pattern parts of the electrodes are covered by electrochromic layers 27 and 27'. When solution type materials are used as the electrochromic material, the electrochromic layers 27 and 27' are dissolved in the electrolyte 26 and deposited on the electrochromic layers 27 and 27' only when they are in a state of coloration. The counter electrode 24' or 24" is provided on the perimeter of the electrochromic display device. In this electrochromic display device, the front substrate 21, the display electrode 23, the insulator layer 23' and the electrolyte 26 are all composed of transparent materials. Accordingly, coloration of both display electrodes 23 and 23' can be observed through the front substrate 21. One of the display electrodes 23 consists of eight segments 41 through 48 as shown in FIG. 4(a) and the other display electrode 23' consists of seven segments 51 through 57 as shown in FIG. 4(b). If these segments 41 through 48 and 51 through 57 are selectively driven, numerals with natural characters can be displayed as shown in FIG. 5. For example, if segments 45, 47, 48 of one electrode and segments 52 of the other electrode 23' are simultaneously driven, the numeral 2 is composed.

It would be difficult to install a large number of segments in this manner on a single substrate, but they can be installed without undue difficulty by distributing them on both substrates as is done in the present invention.

Referring to FIGS. 6a, 6b, 6c, 7a, 7b, 7c, 8a, 8b and 8c, shown therein are examples of displays and display electrode patterns utilized to display the days of the week by means of three-letter English abbreviations.

One of the display electrodes 23 for the first letter consists of the five segments 61 through 65 as shown in FIG. 6(a) and the remaining display electrode 23' consists of the nine segments 71 through 79 as shown in FIG. 6(b). By selectively driving these segments, it is possible to display the letters M, T, W, F and S with natural character forms as shown in FIG. 6(c).

The display electrode 23 for the second letter consists of the seven segments 81 through 87 as shown in FIG. 7(a) and the other display electrode 23' consists of the ten segments 91 through 100 as shown in FIG. 7(b). Accordingly, the letters O, U, E, H, R and A are displayed selectively by the segements as shown in FIG. 7(c).

Similarly, one of the display electrodes 23 for the third letter consists of the eight segments 101 through 108 as shown in FIG. 8(a) and the other display electrode 23' consists of the nine segments 111 through 119 as shown in FIG. 8(b). Accordingly, the letters N, E, D, U, I and T can be displayed selectively by these segments as shown in FIG. 8(c). As a result, the display device with the display electrodes of FIGS. 6, 7 and 8 is able to display in the same place and with natural legible character forms the three-letter English abbreviations, SUN, MON, TUE, WED, THU, FRI and SAT signifying the days of the week.

FIGS. 9a and 9b illustrate the display electrode pattern in another example of an electrochromic display in accordance with the teachings of the present invention. One of the display electrodes consists of Gothic form segments as shown in FIG. 9(a) and the other display electrode consists of Italic-form segments as shown in FIG. 9(b). By using both of these display electrodes, it is possible to display the numerals 0 through 9 with two different character forms in the same place on the display. Shown in FIGS. 10a and 10b are examples of a display utilizing the display electrodes of FIGS. 9a and 9b in an electronic timepiece. In FIG. 10(a) the time 12:50 is displayed in Gothic numerals and the time 7:50 is displayed in Italic numerals as shown in FIG. 10(b) on the same electrochromic display when a pushbutton 120 is pressed. The time in two different time zones can therefore be easily distinguished by switching character forms in this manner.

The above description refers to the composition of patterns by combining segments of the display electrodes on the counter and front substrates and to a method of use in which there is a changeover of character forms from one display electrode to the other. In this invention, however, it is also possible to display deep and light shades of coloration by overlapping segments on both of the display electrodes.

Referring to FIG. 11, shown therein is a graph illustrating the relationship between the driving voltage and coloration density in a general electrochromic display device. As shown in FIG. 11, when the voltage applied across a display and counter electrodes exceeds $V_0$, coloration begins to take place. The coloration density increases with voltage. If the driving voltage applied between the display and counter electrode is $V_1$ or $V_2$, a color density of $C_1$ or $C_2$ is reached after a fixed period of time $T_1$.

FIG. 12 is a graph illustrating the relationship between coloration density and the driving time in a case where the driving voltage is maintained at a fixed level. The coloration density rises abruptly during the initial stage and then gradually reaches a saturation level.

Accordingly, the time $T_2$ required to reach a density of $C_2$ is far longer than the time $T_1$ required to reach a density of $C_1$, which is one-half of $C_2$.

From the standpoint of power consumption and durability of the display device, it is desirable that the driving voltage be maintained as low as possible. However, high coloration density is required for good legibility and a quick response time is desirable. Accordingly, all these requirements are taken into consideration together with a driving voltage which provides an optimum efficiency. When a conventional electrochromic display device is used to display various types of information, the amount of information that can be displayed can be doubled if a light and shade display is used by using different coloration densities, e.g., $C_1$ and $C_2$ in FIG. 11. In order to produce this kind of light and shaded display in a conventional electrochromic display device, it is necessary either to use a two-level voltage source with voltages $V_1$ and $V_2$ are to greatly alter the driving time.

In the present invention, on the other hand, if the front segments and counter segments are both colored at a density of $C_1$, a coloration density of $C_1+C_1=C_2$ is observed in the areas where segments on both the front and counter substrates overlap and a coloration density of $C_1$ is observed in areas where the segments do not overlap. It is clear from the above description that it is possible to produce light and shaded displays with coloration densities of $C_1$ and $C_2$ after a short driving time $T_1$ using only a single voltage source with a low voltage $V_1$.

Referring to FIG. 13, the following is a description of one example in which a light and shaded display system is provided in accordance with the teachings of the present invention to a seconds display of an electronic timepiece. In a digital display electronic timepiece which displays the time in numeric form, systems in which seconds are displayed at 10-second intervals by successively driving six display elements 121 through 126 as shown in FIGS. 10a and 10b are known as semi-analog second display systems. If this invention is applied to such a system, it is possible to produce six different displays by successively causing light coloration of the three display elements 127 through 129 in FIG. 13, colum N B, and then causing deep coloration of the same elements 127 through 129 in the same manner. In other words, since in this invention each display element 127 through 129 can be driven at two shades, light and deep, of coloration, the amount of information that can be displayed is doubled. Accordingly, it is clear that information which normally requires six display elements can be displayed with only three display elements.

FIG. 14 illustrates another display in which light and shaded display systems are provided in accordance with the present invention as applied to a combination display of seconds and days of the week in an electronic timepiece. This display device consists of seven display elements 131 through 137 as shown in FIG. 14, row a, which are driven at two shades of coloration. In order to display the day of the week using this electrochromic display device, all but one of the seven display elements 131 through 137 display a light coloration and the remaining display element displays a deep coloration as shown in FIG. 14, row b. In FIG. 14, row b, the third display element 133 displays a deep coloration thereby indicating three/seven, i.e., Tuesday.

In order to display seconds, all but one of the six display elements 131 through 136 display a light coloration and the remaining display element displays a deep coloration as shown in FIG. 14, row c. In FIG. 14, row c, the third display element 133 displays a deep coloration, thereby indicating three/six, i.e., twenty through twenty-nine seconds. Since all of the display elements in use for the display at least display a light coloration, it is possible to distinguish between the seconds display and the day of the week display.

Figure 15:
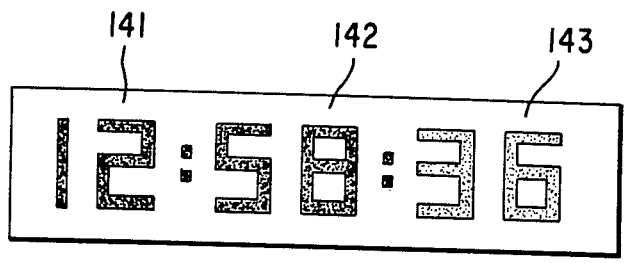
FIG. 15 is an example of an electrochromic display device in accordance with the teachings of the present invention as applied to a digital display for an electronic timepiece of hours, minutes and seconds.

FIG. 15 illustrates another example in which a light and shaded display system in accordance with the teachings of the present invention is applied to a time display of an electronic timepiece. In this timepiece, hours, minutes and seconds are displayed by separate elements 141, 142 and 143. The hours and minutes are displayed by a deep coloration and the seconds are displayed with a light coloration.

In electrochromic display devices energy must be consumed in order to rewrite the display. Since electrochromic materials possess a memory effect, no energy is consumed during the display itself. Accordingly, by making the seconds display (which requires the most frequent rewriting) alone a light colored display, it is possible to achieve a great saving in energy consumption. On the other hand, since the frequency with which the hour and minute displays are rewritten is low, displaying these with a deep coloration makes it possible to improve legibility without increasing energy consumption significantly.

Figure 16:
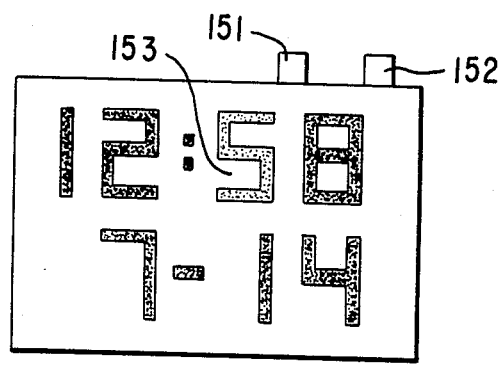
FIG. 16 is an example of an electrochromic display device in accordance with the teachings of the present invention which has been applied to a mechanism for selecting the digit to be corrected in the display of the electronic timepiece.

Referring to FIG. 16, shown therein is an example in which a light and shaded display system in accordance with the teachings of the present invention is applied to the correction of a display in an electronic timepiece.

In order to put the timepiece back into use after it has been stopped to change the battery, or repair, etc., or in order to correct an erroneous display due to incorrect operation, the select button 151 is first operated in order to select a digit to be corrected. Then the correct button 152 is operated, causing a correct signal pulse to be sent to the display so that the display is corrected by being caused to advance. In FIG. 16, the fact that the tens of minutes digit has been selected to be corrected is indicated by a light colored display.

Figure 17A:
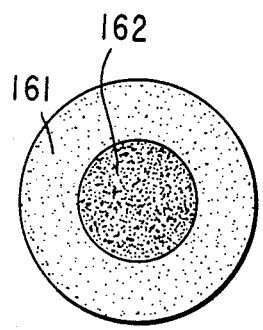
FIGS. 17a, 17b, 17c, 18a, 18b, and 18c illustrate examples of light and shaded displays obtained by means of partial display electrode overlap.
Figure 17B:
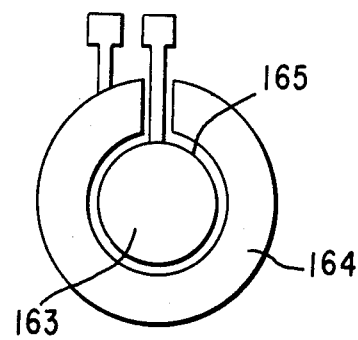
Figure 17C:
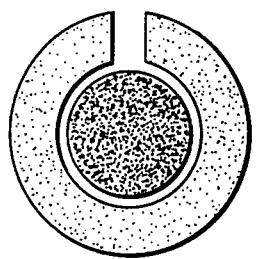

The above description has described various examples in which a light and shaded display is produced by putting the same pattern on a pair of display electrodes causing the two patterns to overlap completely. However, this invention is also effective in cases where the pair of electrodes consists of different upper and lower electrode patterns. For example, in cases where a pattern is displayed in which a peripheral portion 161 is lightly colored and a central portion 162 is deeply colored, as shown in FIG. 17(a), it is necessary in conventional display devices to display electrodes 163 and 164 on the same substrate as shown in FIG. 17(b) and to drive each of these two display electrodes 163 and 164 with a different voltage. In addition, an insulative layer 164 is required for the purpose of insulating the two display electrodes 163 and 164 from each other and the pattern displayed will be similar to that shown in FIG. 17(c). In contrast to this, the overlapping of the two patterns installed on the front and counter substrates in this invention makes it possible to display an unbroken pattern as shown in FIG. 17(a) utilizing a single voltage source.

The phenomenon that the visual sensitivity of the human eye in recognizing a pattern is proportional to the differential value or gradient of the light and shaded variation is known as the Mach effect.

Figure 18A:
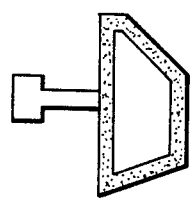
Figure 18B:
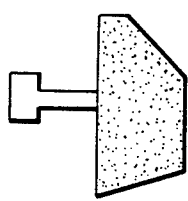
Figure 18C:
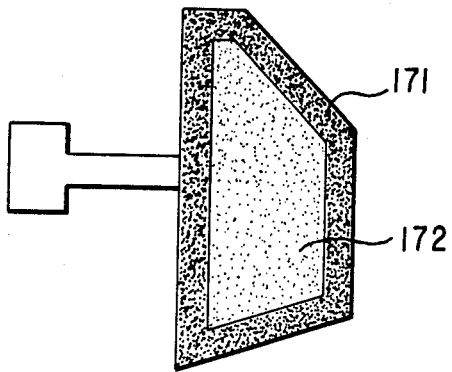

FIG. 18(c) illustrates one segment of a display element in an electrochromic display in which the Mach effect has been applied. By making the peripheral portion 171 a deep shade and the central portion 172 a light shade, legibility is improved over what it would have been if the entire segment showed the same amount of contrast and a saving in energy comsumption is also made. In this invention, the pattern such as shown in FIG. 18(c) can be displayed by overlapping patterns such as those shown in FIGS. 18(a) and 18(b).

From the foregoing description, it should be apparent that in the electrochromic display device provided by this invention the display electrodes are installed on both the front and counter substrates. Since the display electrodes are installed in both the front and counter substrates, it is possible to produce alphanumeric displays with natural, legible characters by using display electrodes consisting of large numbers of segments. Furthermore, it is also possible to display numerals with two different character forms. In addition, it is also possible to produce a light and shaded display using a single voltage source and to double the information content displayed using a limited number of display elements. Furthermore, the device can be driven at a sufficient coloration density by a lower voltage than that used in prior art devices and the response speed is greatly improved. Accordingly, the device provided by this invention is effective in a wide range of applications as a display device in digital display electronic timepieces, desk top calculators, etc..

It should be apparent that the driving signal for the above described electrochromic display can be derived from electronic circuits which exist in the prior art. In addition, such circuits can be integrated circuits of the type used in electronic timepieces. Furthermore, in all cases it is understood that the above described embodiments are merely illustrative of but a few of the many possible specific embodiments which can represent the applications of the principles of the present invention. Numerous and various other arrangements can be readily devised by those skilled in the art without departing from the spirit and scope of the invention.

I claim:

1. An electrochromic display device comprising:
a transparent front substrate;
at least one transparent first display electrode, which is part of a predetermined display pattern, formed on said front substrate;
a counter substrate parallel to said front substrate;
at least one second display electrode provided on said counter substrate adjacent said first display electrode on said front substrate, said second display electrode forming the remainder of said predetermined display pattern, said first and said second display electrodes being arranged and configured such that said predetermined display pattern is displayed by driving said first and said second display electrodes at the same time; an electrochromic material on said first and said second display electrodes; a transparent electrolyte enclosed between said front and said counter substrates; said transparent electrolyte in contact with said electrochromic material; and
a counter electrode in electrical contact with said electrolyte.

2. A display device according to claim 1 wherein a plurality of first display electrodes are provided on said front substrate which are parts of said predetermined display pattern and a plurality of second display electrodes are provided on said counter substrate which form the remainder of said predetermined display pattern whereby said predetermined display pattern is composed of a predetermined number of said first display electrodes and said second display electrodes.

3. A display device according to claim 2 wherein said plurality of first and second display electrodes are formed as linear and curved portions such that numbers and letters of the alphabet are displayed in natural character forms.

4. A display device according to claim 3 wherein said display device is capable of displaying the time and days of the week.

5. A display device according to claim 1 wherein a plurality of said first display electrodes are provided on said front substrate and a plurality of said second display electrodes are displayed on said counter substrate and in which said first display electrodes are configured in a predetermined pattern of a first predetermined character form and said second display electrodes are configured in a second predetermined pattern and said first predetermined character form is different than said second predetermined pattern.

6. A display device according to claim 5 wherein different time information displayed is distinguished by the character forms used.

7. A display device according to claim 1 wherein a plurality of said first display electrodes are provided on said front substrate and a plurality of said second display electrodes are provided on said counter substrate and in which a predetermined number of said second display electrodes overlap said first display electrodes whereby light coloration density may be obtained by selectively driving one display electrode and a deep coloration density may be obtained by selectively driving an overlapping first and second display electrodes.

8. A display device according to claim 7 wherein all of said second display electrodes have the same pattern as said first display electrodes and overlap said first display electrodes completely.

9. A display device according to claim 8 wherein said display is a semi-analog form seconds display comprising three display elements whereby the seconds are displayed by light and deep coloration of said display elements.

10. A display device according to claim 8 for displaying seconds and days of the week comprising seven display elements whereby the seconds and days of the week are indicated by light coloration.

11. A display device according to claim 8 for displaying seconds and days of the week comprising seven display elements whereby the seconds and days of the week are indicated by deep coloration.

12. A display device according to claim 8 wherein hours and minutes are displayed in a deep coloration and seconds are displayed in a light coloration.

13. A display device according to claim 7 wherein said first and second display elements partially overlap so that a display pattern is displayed in which there is no break between the deep coloration and light coloration.

* * * * *